(12) United States Patent
Talla et al.

(10) Patent No.: US 7,362,362 B2
(45) Date of Patent: Apr. 22, 2008

(54) REFORMATTER AND METHOD

(75) Inventors: Deependra Talla, Dallas, TX (US);
Clay Dunsmore, Garland, TX (US);
Ching-Yu Hung, Plano, TX (US)

(73) Assignee: Texas Instruments Incorporated,
Dallas, TX (US)

( * ) Notice: Subject to any disclaimer, the term of this patent is extended or adjusted under 35 U.S.C. 154(b) by 758 days.

(21) Appl. No.: 10/888,701

(22) Filed: Jul. 9, 2004

(65) Prior Publication Data

US 2006/0007332 A1   Jan. 12, 2006

(51) Int. Cl.
*H04N 5/335* (2006.01)
(52) U.S. Cl. .................. 348/273; 348/280; 348/241

(58) Field of Classification Search ............... 348/273, 348/280, 272
See application file for complete search history.

(56) References Cited

U.S. PATENT DOCUMENTS 6,630,956 B1 * 10/2003 Toi ........................... 348/273
6,933,970 B2 * 8/2005 Koshiba et al. ............ 348/273

* cited by examiner

*Primary Examiner*—Ngoc-Yen Vu
*Assistant Examiner*—Adam L Henderson
(74) *Attorney, Agent, or Firm*—Wade J. Brady, III; Frederick J. Telecky, Jr.

(57) ABSTRACT

A programmable data reformatter reorders output from an image sensor to yield various formats. The reformatting applies to reduced resolution output from large image sensors as in digital cameras operating in video mode, and converts an irregular video mode output to a standard format, such as Bayer pattern, for image processing.

6 Claims, 3 Drawing Sheets

REFORMATTER AND METHOD

BACKGROUND OF THE INVENTION

The present invention relates to electronic devices, and more particularly to image reformatting methods and related devices such as digital cameras.

Recently, digital cameras have become a very popular consumer appliance appealing to a wide variety of users ranging from photo hobbyists, web developers, real estate agents, insurance adjusters, photo-journalists to everyday photography enthusiasts. Advances in large resolution CCD/CMOS sensors coupled with the availability of low-power digital signal processors (DSPs) has led to the development of digital cameras with both high resolution image and short video clip capabilities, and these capabilities have spread into various consumer products such as cellular phones. The high resolution (e.g., sensor with a 2560×1920 pixel array) provides quality offered by traditional film cameras. U.S. Pat. No. 5,528,293 and U.S. Pat. No. 5,412,425 disclose aspects of digital camera systems including storage of images on memory cards and power conservation for battery-powered cameras.

FIG. 3a is a functional block diagram for digital camera control and image processing; the automatic focus, automatic exposure, and automatic white balancing are referred to as the 3A functions. The image processing typically includes functions such as color filter array (CFA) interpolation, gamma correction, white balancing, color space conversion, and JPEG/MPEG compression/decompression (JPEG for single images and MPEG for video clips) and is referred to as the image pipeline. Note that the typical color CCD consists of a rectangular array of photosites (pixels) with each photosite covered by a filter (CFA): red, green, or blue. In the commonly-used Bayer pattern CFA one-half of the photosites are green, one-quarter are red, and one-quarter are blue. FIG. 3b illustrates possible hardware components for a digital camera.

The current trend of incorporating video capabilities into high resolution digital cameras creates a problem because the camera must satisfy both the high resolution of a still image camera and the high frame rate/low resolution requirements of a video camera. Consequently, most image sensors (CCD or CMOS) employ schemes to average pixel values within the sensor device for video mode. Averaging pixels does two things:

- It reduces the number of pixels per frame so that a desired video frame rate can be achieved without straining the pixel rate. For example, a 5 megapixel sensor (2560×1920 pixel array) which can internally reduce output to VGA (640×480) resolution will achieve 30 frames per second needed for video with a 9 Mpixels/second output rate. Without such internal averaging the device will need an output rate of 150 Mpixels/second rate to achieve 30 frames/second, and this is much faster than current analog front ends (AFEs), which include analog-to-digital conversion, can operate.
- It reduces the noise. Noise introduced in the sensor and the signal path can be reduced through averaging.

The averaging of pixel values in the sensor device, however, poses challenges for the subsequent image pipeline processing of the pixel data. Indeed, the sensor often outputs video-mode data in some fixed, regular, but locally scrambled format and not in normal raster-scan order. The video format is not consistent across various sensor manufacturers. Thus it is a problem of image pipelines to support all the different video output formats, including adaptation to future formats.

SUMMARY OF THE INVENTION

The present invention provides devices and methods for programmable reformatting of image sensor pixel output.

This has advantages including substitutability of image sensors within digital cameras with a single image pipeline.

BRIEF DESCRIPTION OF THE DRAWINGS

The drawings are heuristic for clarity.

DESCRIPTION OF THE PREFERRED EMBODIMENTS

1. Overview

Preferred embodiment reformatters and reformatting methods (programmably) convert image sensor (CCD/CMOS) output pixel streams into another (standard) format, such as raster-scan Bayer format. Reformatting enables various image sensor output formats to be used with a single image pipeline. Video-mode output formats vary among image sensor manufacturers due in part to the particular downsampling implementation: a 5 megapixel image (e.g., 2560×1920 pixels) is downsampled by a factor of 4 in both dimensions to yield a VGA 640×480 video output frame, and this large downsampling factor allows for many alternative output stream formats.

Figure 1A:
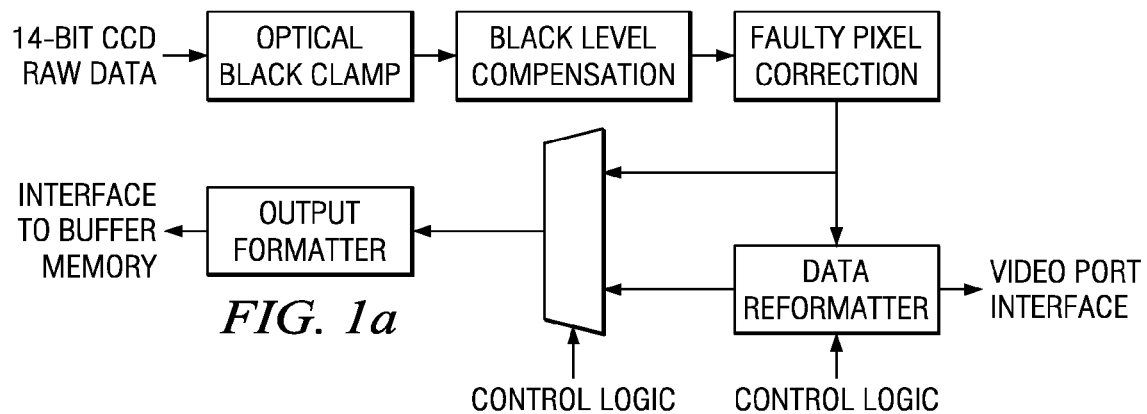
FIGS. 1a-1b are functional block diagrams of preferred embodiment pipeline reformatter and location.

FIG. 1a shows a reformatter following faulty pixel correction and prior to memory write or video-mode processing; however, the reformatter may be at other locations in the processing, such as between the optical black clamp and the faulty pixel correction. Note that in order to optimize the dynamic range of the pixel values represented by the image sensor, the pixels representing black should have a 0 value. The black clamp function adjusts for this by subtracting an offset for each pixel. There is only one color channel per pixel at this stage of the processing, and rearranging the pixel location order can be either prior to or after black clamp.

Similarly, image sensor arrays may have faulty (missing) pixels, especially arrays with more than 500,000 elements. The missing pixel values are filled by simple interpolation within the array; a high order interpolation may not be necessary because a later interpolation is also performed in the CFA interpolation stage. Therefore, the main reason for this preliminary faulty pixel correction interpolation step is to make the image processing regular by eliminating missing data. Again, the faulty pixel correction may precede or follow a rearrangement of the pixel location order.

Figure 1B:
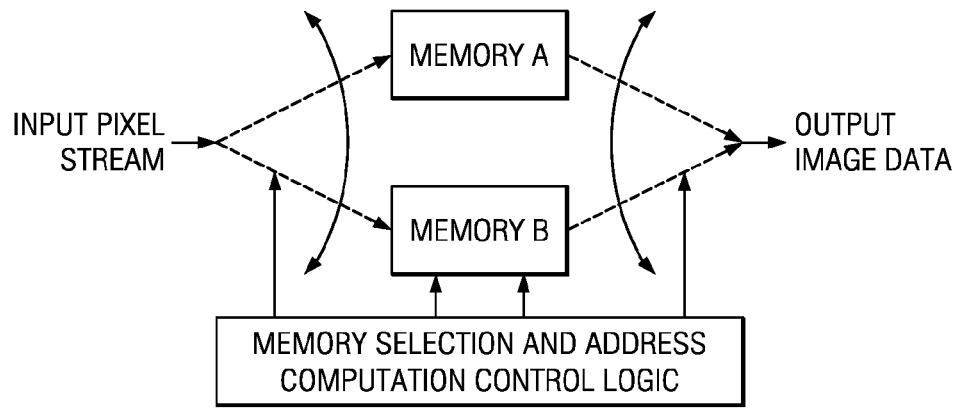

FIG. 1b shows a reformatter with duplicate local memories; this allows the reformatter to write incoming pixels to one memory while the rest of the processing reads reformatted pixels from the other memory. Each of the two memories may store 2560 10-bit or 14-bit pixels to hold two R-B pairs of 640 pixel lines in Bayer format.

Preferred embodiment camera systems and devices, such as digital still cameras and video-capable cellular phones, include preferred embodiment reformatting. The reformatting computations can be performed with digital signal processors (DSPs) or general-purpose programmable processors or application specific circuitry, or systems on a chip such as a DSP, application specific circuitry, and a RISC processor on the same chip with the RISC processor controlling. The reformatting parameters are programmed (ROM, Flash EEPROM, FeRAM, etc.) to adapt to the image sensor used in the camera system. Analog-to-digital converters and digital-to-analog converters provide coupling to the real world, and modulators and demodulators (plus antennas for air interfaces) provide coupling for wireless transmission.

2. Stride Pattern Preferred Embodiments

First preferred embodiments write (output) successive input pixels to (local) memory with the write address controlled according to increments and decrements (strides) which are programmable parameters. The programmability (either dynamic or static) of the parameters allows for adaptation to a particular image sensor. The parameters are:

initial value of output address strides (output address increments and decrements for the input pattern)

number of strides for the input pattern

The following pseudocode implements the first preferred embodiment with output_pointer a pointer to memory for writing the current incoming pixel and stride[index] the increment/decrement to be used to jump to the next address:

```
output_pointer = initial_output_address
index = 0
for each input pixel
    store input pixel at location pointed to by output_pointer
    output_pointer = output_pointer + stride[index]
    index = index + 1
    if (index >= num_strides)
        index = 0
```

Figure 2:
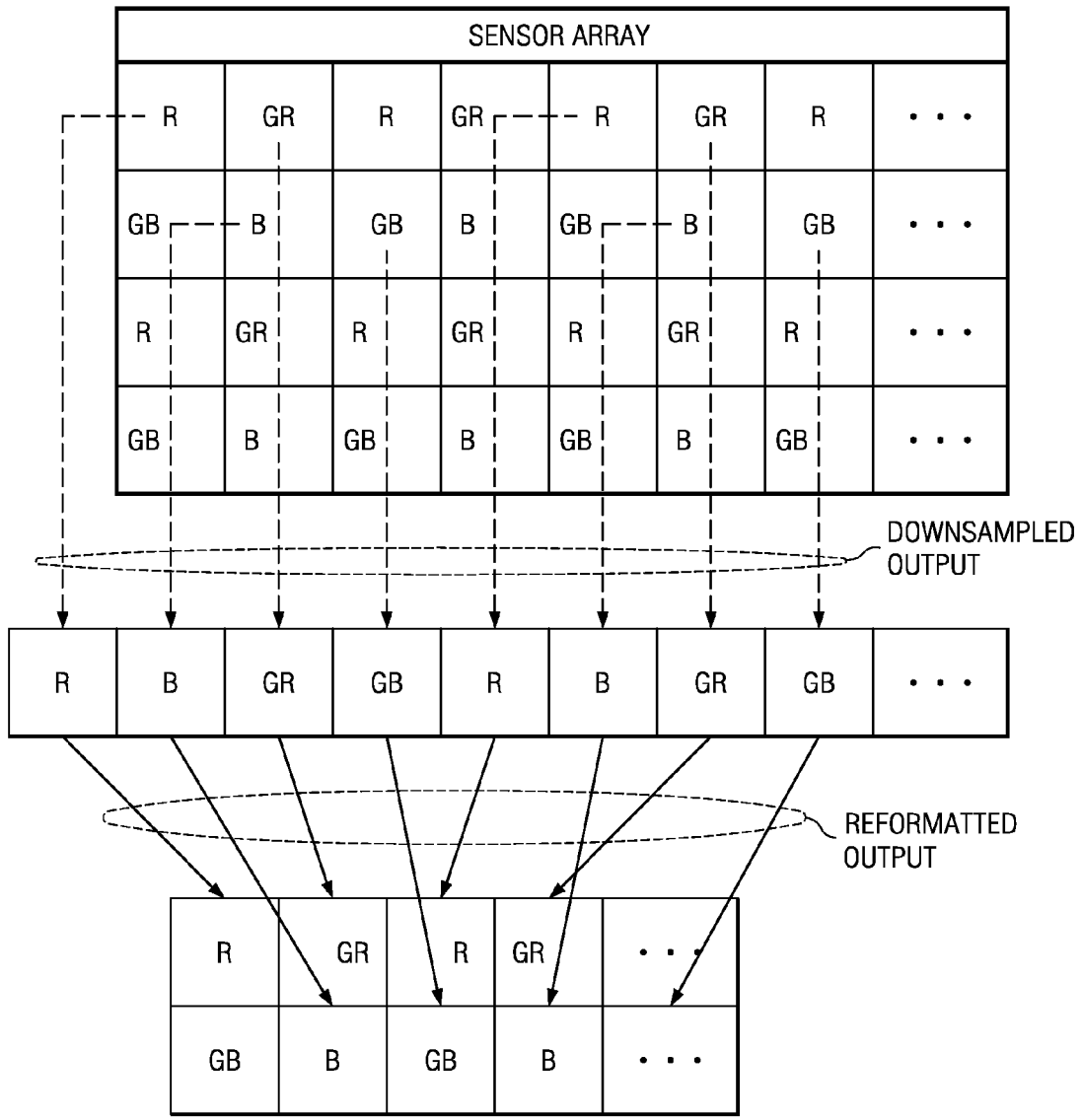
FIG. 2 illustrates video-mode downsampling.
Figure 3A:
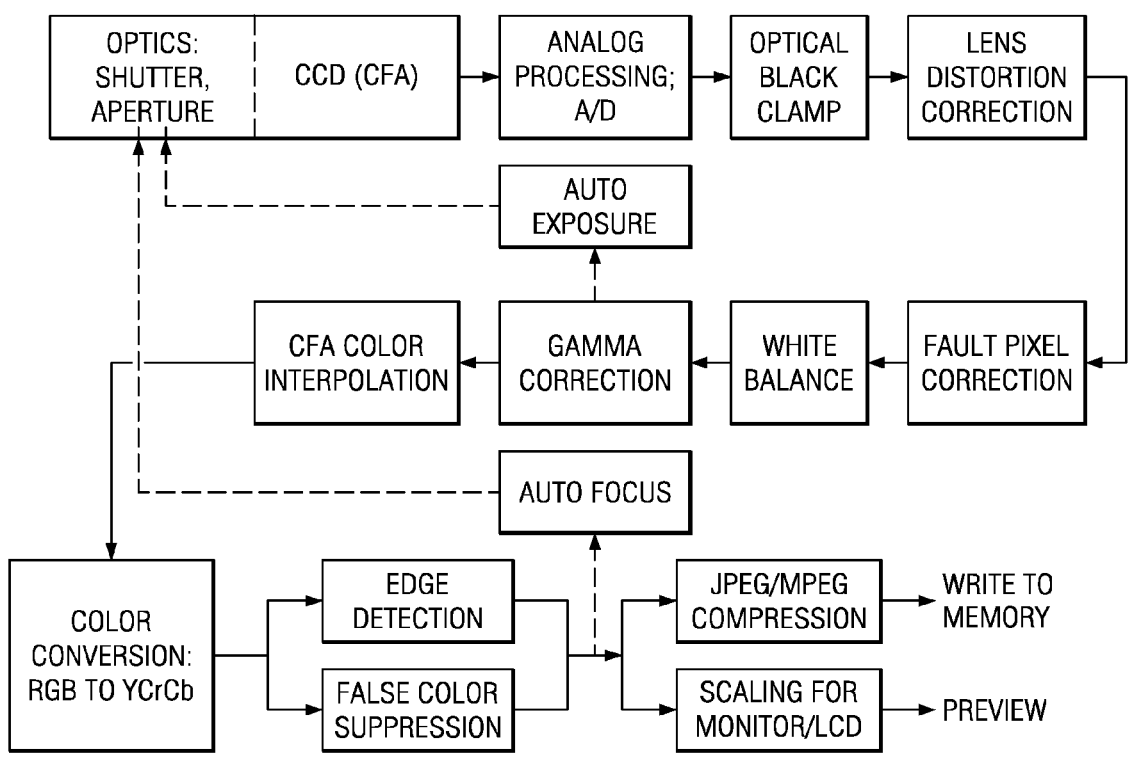
FIGS. 3a-3b show functional and hardware blocks of of a digital camera.
Figure 3B:
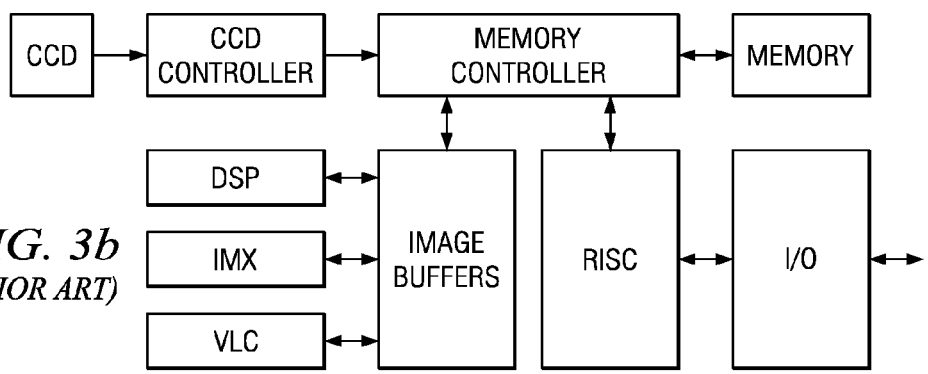

As an example, consider a sensor with video-mode output of frames of size 400×300 pixels and with the sensor output pixel stream R B Gr Gb R B Gr Gb . . . for two lines of raster-scan Bayer format. The upper portion of FIG. 2 illustrates a sensor array with downsampling by a factor of 2 in each dimension to a video-mode output, and lower portion of FIG. 2 shows the preferred embodiment reformatting of this output pixel stream into raster-scan Bayer format with a 400 pixel line R Gr R Gr . . . followed by a 400 pixel line Gb B Gb B . . . . Thus presuming the first R pixel to be sent to address 0, the input stream to the reformatter and the corresponding address for writing to local memory are:

| R | B | Gr | Gb | R | B | Gr | Gb | . . . |
|---|---|----|----|----|---|----|----|-------|
| 0 | 401 | 1 | 402 | 2 | 403 | 3 | 404 | . . . |

Hence, after reformatting the corresponding output in memory (addresses and contents) looks like:

| 0 | 1 | 2 | 3 | 4 | 5 | 6 | 7 | . . . |
|---|---|---|---|---|---|---|---|-------|
| R | Gr | R | Gr | R | Gr | R | Gr | . . . |

| 400 | 401 | 402 | 403 | 404 | 405 | 406 | 407 | . . . |
|-----|-----|-----|-----|-----|-----|-----|-----|-------|
| —   | B   | Gb  | B   | Gb  | B   | Gb  | B   | . . . |

Thus the preferred embodiment for this sensor output pattern applies with the initial address (initial_output_address)=0, the number of strides (num_strides)=2, the first stride (stride[0])=401; and the second stride (stride[1])=−400. That is, the write address (output_pointer) has successive values: 0, 401, 1, 402, 2, 403, 3, 404, 4, . . .

With other sensor output pixel patterns the parameters are adjusted to likewise reformat to the raster-scan Bayer format. For a second example, if the foregoing first example were modified by the interchange of B and Gr so that the video-mode output pixel stream is R Gr B Gb R Gr B Gb . . . , then the pixel stream and corresponding address for memory write are:

| R | Gr | B | Gb | R | Gr | B | Gb | . . . |
|---|----|---|----|----|----|---|----|-------|
| 0 | 1 | 401 | 402 | 2 | 3 | 403 | 404 | . . . | and the output reformatted in memory is again:

| 0 | 1 | 2 | 3 | 4 | 5 | 6 | 7 | . . . |
|---|---|---|---|---|---|---|---|-------|
| R | Gr | R | Gr | R | Gr | R | Gr | . . . |

| 400 | 401 | 402 | 403 | 404 | 405 | 406 | 407 | . . . |
|-----|-----|-----|-----|-----|-----|-----|-----|-------|
| —   | B   | Gb  | B   | Gb  | B   | Gb  | B   | . . . |

This time the preferred embodiment applies with initial_output_address=0 as before, but with a larger number of strides (num_strides=4), the first stride (stride[0])=1; the second stride (stride[1])=400, the third stride (stride[2])=1; and the fourth stride (stride[3])=−400. That is, the write address (output_pointer) has successive values: 0, 1, 401, 402, 2, 3, 403, . . .

More involved video-mode output pixel patterns could include intermingling pixels from more than a pair of R-B lines of raster-scan Bayer format. For a third example, if two red and two blue lines are multiplexed, then the video-mode output could be R1 Gb1 R2 Gb2 Gr1 B1 Gr2 B2 R1 Gb1 R2 . . . and the corresponding address for memory write would be:

| R1 | Gb1 | R2 | Gb2 | Gr1 | B1 | Gr2 | B2 | R1 | . . . |
|----|-----|----|----|-----|----|-----|----|----|-------|
| 0  | 400 | 800 | 1200 | 1 | 401 | 801 | 1201 | 2 | . . . |

Thus the memory would contain a first Bayer red line (R1s and Gr1s) of 400 pixels followed by a first blue line, a second red line, and a second blue line; and then repeats from subsequent inputs.

For this example the preferred embodiment applies with initial_output_address=0 as before, and again with four strides (num_strides=4), but the first three strides all equal 400 (stride[0]=stride[1]=stride[2]=400); and the fourth stride is a large decrement (stride[3]=−1199). For this sensor the write address (output_pointer) has successive values: 0, 400, 800, 1200, 1, 401, 801, . . . .

In short, the pixel output pattern prescribes a set of strides, and the preferred embodiments take these strides as parameter inputs.

3. Write-Out Bit Pattern Preferred Embodiments

Second preferred embodiments write successive input pixels to (local) memory with the write address controlled according to the following programmable parameters:
 number of output lines per input line
 length of each output line
 bit vector (bit pattern repeated) for each output line, 1s denote pixels of input to distribute to that output line and 0s denote pixels to another line
 length of the bit vectors
 initial offset in each output line As with the preceding first example; presume the following input pixel stream to the second preferred embodiment reformatter with desired reformatted memory location:

| R | B | Gr | Gb | R | B | Gr | Gb | . . . |
|---|---|----|----|---|---|----|----|-------|
| 0 | 401 | 1 | 402 | 2 | 403 | 3 | 404 | . . . | and so again the reformatted pixel pattern in memory looks like:

| 0 | 1 | 2 | 3 | 4 | 5 | 6 | 7 | . . . |
|---|---|---|---|---|---|---|---|-------|
| R | Gr | R | Gr | R | Gr | R | Gr | . . . |

| 400 | 401 | 402 | 403 | 404 | 405 | 406 | 407 | . . . |
|-----|-----|-----|-----|-----|-----|-----|-----|-------|
| —   | B   | Gb  | B   | Gb  | B   | Gb  | B   | . . . |

Thus the bit vector (bit pattern repeat) 1010 applied to the input stream has R (to location 0), Gr (to location 1), R (to location 2), . . . going to the first reformatted output line; and the bit vector 0101 has B (to location 401), Gb (to location 402), B (to location 403), . . . going to the second reformatted output line. The initial offset for the second line is 1. Indeed, the values of the control parameters for this example are:
 Number of output lines per input line=2
 Length of each output line=400
 Bit vectors for the first and second output lines='1010' and '0101'
 Length of bit vectors=4
 Initial offset in first and second output lines=0 and 1

The second preferred embodiments implement the following pseudocode for each sensor output line (the output pixel stream for a (downsampled) horizontal strip of the sensor array). The variables are: line_index is the reformatted location line (lines numbered 0, 1, . . . , num_lines) for the current input pixel, pixel index[i] denotes the reformatted location for the current input pixel in line i, bit_vector[i][j] denotes the [i][j] element of the matrix of the bit vectors (the matrix is searched to find the next output line):

```
// initialization for each line output from sensor into reformatter
    for each reformatter output line i
        pixel_index[i] = initial offset[i]
    line_index = 0
    bit_index = 0
    //find to which output line the first input pixel should go
    while (bit_vector[line_index][bit_index] = 0)
        line_index = line_index + 1
//pixel loop
    for each input pixel
        store input pixel at current location
        (line_index : pixel_index[line_index])
        pixel_index[line_index] = pixel_index[line_index] + 1
        // advance to next bit in bit vectors and then identify output line
        bit_index = bit_index + 1
        if (bit_index >= length_bit_vector)
            bit_index = 0
        while (bit_vector[line_index][bit_index] = 0)
            line_index = line_index + 1
            if (line_index >= num_lines)
                line_index = 0
```

4. Multiple Output Pointer Preferred Embodiments

Third preferred embodiment reformatters and methods use a memory pointer for each output line and a control program to apply the pointers to the incoming pixel stream ordering; the methods have the following control parameters:
 Output pointers' initial pixel indices
 Control program, indicating which pointer to use after the increment/-decrement, and which output line to write to
 Length of control program
 Length of output line With the same foregoing first example (but without explicit output line length=400), the pixel input stream to the reformatter and the reformatted address (line number: location in line) are:

| R | B | Gr | Gb | R | B | Gr | Gb | . . . |
|---|---|----|----|---|---|----|----|-------|
| 0:0 | 1:1 | 0:1 | 1:2 | 0:2 | 1:3 | 0:3 | 1:4 | . . . |

And the reformatted output (memory address and contents) is:

| Line 0: | | | | | | | | |
|---------|---|---|---|---|---|---|---|---|
| 0 | 1 | 2 | 3 | 4 | 5 | 6 | 7 | . . . |
| R | Gr | R | Gr | R | Gr | R | Gr | . . . |

Line 1:

| 0 | 1 | 2  | 3 | 4  | 5 | 6  | 7 | ... |
|---|---|----|---|----|---|----|---|-----|
| — | B | Gb | B | Gb | B | Gb | B | ... |

Thus the sequence of output addresses for the input pixel stream is: 0:0, 1:1, 0:1, 1:2, 0:2, 1:3, 0:3, 1:4, ... which can be implemented with two output pointers, P0 and P1. The parameter values for this example would be:

Initial pixel indices (pointer values)=0 and 1
   Control program is {0:P0:++, 1:P1:++}
   Length of control program=2
   Length of output line The following pseudocode implements the third preferred embodiments:

```
//initialization for each input line
for each pointer i
    pointer[i] = initial_index[i]
line_index = 0
program_index = 0
//pixel loop
for each input pixel
    (line_index : pointer_index : action) =
    control_program[program_index]
    store input pixel at location (line_index : pointer[pointer_index])
    program_index = program_index + 1
    if(program_index >= length_program)
        program_index = 0
    if(action = "++")
        pointer[pointer_index] = pointer[pointer_index] + 1
    else if(action = "−")
        pointer[pointer_index] = pointer[pointer_index] − 1
```

The third preferred embodiments comprehend new CCD sensors that can read out pixels from both the left and the right edges of the sensor array, which requires the output address to increment (normal left-to-right sweep) and decrement (reverse right-to-left sweep) in an interleaved manner. The pointer decrement instruction deals with the reverse addressing.

Preferred embodiment hardware can have 8 or more output pointers, a line index of at least 2 bits (for up to 4 output lines) and control programs with at least 16 entries to deal with various sensor output formats. Also, the output lines (Bayer format) are logical and not physical lines in local memory. That is, in FIG. 1b local memory A (and likewise memory B) is any convenient physical memory which will be sequentially read out as the output lines.

As another example, again consider the foregoing second example:

| R   | Gr  | B   | Gb  | R   | Gr  | B   | Gb  | ... |
|-----|-----|-----|-----|-----|-----|-----|-----|-----|
| 0:0 | 0:1 | 1:1 | 1:2 | 0:2 | 0:3 | 1:3 | 1:4 | ... |

The control program now has length 4:
   control_program[0]=(0:0:++)
   control_program[1]=(0:0:++)
   control_program[2]=(1:1:++)
   control_program[3]=(1:1:++)

In contrast, a control program with four pointers, P0, ..., P3, where P0 is for R pixels, P1 is for Gr pixels, P2 is for B pixels, P3 is for Gb pixels, could be:
   control_program[0]=(0:0:++)
   control_program[1]=(0:1:++)
   control_program[2]=(1:2:++)
   control_program[3]=(1:3:++)

This has two pointers for each output line, and the initializations would be 0, 1, 1, 2, for P0, P1, P2, P3, respectively. The increment would change to:
   if (action="++")
      pointer[pointer_index]=pointer[pointer_index]+2

5. Modifications

The preferred embodiments may be varied while retaining one or more of the features of a (programmable) reordering of the sensor array output pixel stream.

For example, the output lines could correspond to a non-Bayer format; the sensor output need not be a downsampling of the full array, such as the third preferred embodiment could be used just to allow right-to-left readout at full resolution; the specific numbers (e.g., output lines with 400 sample in the first preferred embodiments and up to 8 pointers in the third preferred embodiments) could be varied; and so forth.

What is claimed is:

1. A method of reformatting image sensor output, comprising:
(a) providing first, second, ..., nth strides, where n is a positive integer greater than 1, said strides adapted to the output sequence of an image sensor;
(b) applying a first output from said image sensor to a first location; and then
(c) sequentially for each integer k in the range 2 to N, applying a kth output from said image sensor to a kth location determined as the immediately preceding (k−1)th location plus a kth step, wherein when k is in the range from jn+2 to jn+1+n for a non-negative integer, said kth step equals said (k−1−jn)th stride, where said locations form alternating red lines and blue lines for a Bayer pattern.

2. The method of claim 1, wherein:
(a) n=4.

3. A method of reformatting image sensor output, comprising:
(a) providing bit vectors indexed from 0 to n−1, where n is a positive integer greater than 1, said bit vectors adapted to the output sequence of an image sensor; and
(b) sequentially for each integer k in the range 1 to N, for the kth output from said image. sensor determining a kth output line in the range 0 to n−1 and a kth location within said kth output line by:
(i) searching said bit vectors at a current position to determine said kth output line;
(ii) incrementing said current position within said bit vectors with wraparound; and
(iii) incrementing a location within said kth output line;
where said output lines form red lines and blue lines for a Bayer pattern.

4. The method of claim 3, wherein:
(a) n=2.

5. A method of reformatting image sensor output, comprising:

(a) providing pointers indexed from 0 to n−1, where n is a positive integer greater than 1, and a control program, said pointers and said program adapted to the output sequence of an image sensor; and (b) sequentially for each integer k in the range 1 to N, for the kth output from said image sensor determining a kth output line in the range 0 to n−1 and a kth location within said kth output line by:

(i) reading said kth output line from a current control program value;

(ii) reading a kth pointer index for said kth location from said current control program value;

(iii) determining said kth location as a value of the pointer with said kth pointer index;

(iv) updating said pointer of (iii) according to said current control program value; and (v) incrementing said current control program with wraparound;

where said output lines form red lines and blue lines for a Bayer pattern.

6. The method of claim 5, wherein:

(a) n=2.

* * * * *